(12) United States Patent
Leidig et al.

(10) Patent No.: US 7,479,195 B2
(45) Date of Patent: Jan. 20, 2009

(54) METHOD OF FORMING MULTI-COLORED COMPOSITE BY PINSONIC EMBOSSING

(75) Inventors: Erich Leidig, Mannheim (DE); Gerhard Stuppy, Heltersberg (DE)

(73) Assignee: Freudenberg Vliesstoffe KG, Weinheim (DE)

( * ) Notice: Subject to any disclaimer, the term of this patent is extended or adjusted under 35 U.S.C. 154(b) by 29 days.

(21) Appl. No.: 10/973,658

(22) Filed: Oct. 26, 2004

(65) Prior Publication Data
US 2006/0089071 A1 Apr. 27, 2006

(51) Int. Cl.
*B32B 37/00* (2006.01)
(52) U.S. Cl. .................. 156/73.1; 156/290; 156/308.4; 156/580.2
(58) Field of Classification Search ................ 156/73.1, 156/73.3, 252, 290, 308.2, 308.4, 580.1, 156/580.2
See application file for complete search history.

(56) References Cited

U.S. PATENT DOCUMENTS

| | | | |
|---|---|---|---|
| 3,626,143 A | 12/1971 | Fry | 219/121 |
| 4,086,112 A | 4/1978 | Porter | |
| 4,259,399 A | 3/1981 | Hill | |
| 4,374,888 A | 2/1983 | Bornslaeger | |
| 4,419,160 A | 12/1983 | Wang et al. | |
| 4,767,492 A * | 8/1988 | Fukusima et al. | 156/580.2 |
| 5,085,914 A | 2/1992 | Perdelwitz, Jr. et al. | 428/137 |
| 5,585,017 A | 12/1996 | James et al. | 219/121.71 |
| 5,728,451 A * | 3/1998 | Langley et al. | 428/198 |
| 5,801,868 A | 9/1998 | Hayasaka et al. | 359/202 |
| 5,916,462 A | 6/1999 | James et al. | 219/121.71 |
| 5,928,842 A | 7/1999 | Shinmoto et al. | 430/346 |
| 6,169,266 B1 | 1/2001 | Hughes | 219/121.68 |
| 6,294,124 B1 | 9/2001 | Bauer et al. | 264/400 |
| 6,315,202 B2 | 11/2001 | Costin et al. | 235/462.09 |
| 6,533,885 B2 | 3/2003 | Davis et al. | 156/219 |
| RE38,105 E | 5/2003 | James et al. | 28/105 |
| 6,633,019 B1 | 10/2003 | Gray | 219/121.71 |
| 6,693,657 B2 | 2/2004 | Carroll, Jr. et al. | 347/224 |

(Continued)

FOREIGN PATENT DOCUMENTS

JP 4173142 * 6/1992

(Continued)

OTHER PUBLICATIONS

Assembly Magazine "The Expanded Reach of Laser Marking"; Issue date Jul. 1, 2002; (6 pages); http://www.assemblymag.com.

(Continued)

*Primary Examiner*—James Sells
(74) *Attorney, Agent, or Firm*—Grossman, Tucker, Perreault & Pfleger, PLLC

(57) ABSTRACT

A method of forming a multi-colored multi-layered non-woven composite includes the application of ultrasonic energy to the top layer to displace a portion of that layer in a predetermined pattern such that openings are formed through which any underlying layer may be visible. In related embodiments, the use of pinsonic or ultrasonic embossing of a non-woven layer provides a three-dimensional colored pattern due to melting and densification of the fibers and/or the activation of heat activatable pigments or dyes used to color the non-woven.

23 Claims, 2 Drawing Sheets

U.S. PATENT DOCUMENTS

| | | | | |
|---|---|---|---|---|
| 6,706,785 | B1 | 3/2004 | Fu | 523/200 |
| 6,776,323 | B2 * | 8/2004 | Schmidt | 228/1.1 |
| 2001/0009172 | A1 | 7/2001 | Thielman et al. | 156/73.1 |
| 2001/0055684 | A1 | 12/2001 | Davis et al. | 428/379 |
| 2002/0097279 | A1 | 7/2002 | Mimura et al. | 346/140.1 |
| 2004/0132892 | A1 | 7/2004 | Kawakami et al. | 524/495 |

FOREIGN PATENT DOCUMENTS

| | | |
|---|---|---|
| WO | WO 00/46045 | 8/2000 |

OTHER PUBLICATIONS

EBR Manufacturing, Inc. "About Us" (3 pgs); http://www.ebrmfg.com/aboutus.htm.

EBR Manufacturing, Inc. "Process/Process Capabilities" (2 pgs); http://www.ebrmfg.com/process.htm.

EBR Manufacturing, Inc. "Products/Product Applications" (2 pgs); http://www.ebrmfg.com/productapp.htm.

"Engraving" Polyester Fleece (2 pgs); Synrad, Inc., Mukilteo, WA.; Process date: Oct. 1999; http://www.synrad.com.

H.W.Sands Corp.; Thermochromics; Color/Temperature price list (1 pg) (Dec. 4, 2003); hwsands@hwsands.com.

H.W. Sands Corp.; Thermochromics Paint and Ink Recommendations (1 pg); hwsands@hwsands.com.

Ultrasonics Basic Principles and Design Guidelines (Herrmann Ultraschalltecknik brouchure; 15 pgs); http://www.HerrmannUltraschall.com.

The Dukane Store; Products "Dukane Intelligent Assembly Solutions/Ultrasonic Plastics Assembly" (8 pgs); http://www.dukcorp.com.

Ultrasonic Technical Information; "Ultra Sonic Seal" (5 pgs); http://www.ultrasonicseal.com/tech.html.

International Search Report and The Written Opinion of the International Searching Authority; ISA is EPO; date of mailing Oct. 20, 2006; issued in the corresponding International Application No. PCT/IB2005/004129 (9 pgs).

* cited by examiner

METHOD OF FORMING MULTI-COLORED COMPOSITE BY PINSONIC EMBOSSING

FIELD OF INVENTION

This invention relates to multi-colored composites and, more particularly, to forming a multi-colored multi-layered composite by pinsonic embossing.

BACKGROUND OF THE INVENTION

Multi-colored decorative surfaces are desirable to differentiate products in many industries. Automotive interior trim, furniture, clothing, house sundries and many other products may benefit by providing surfaces which are more pleasing, and decorative or which have indicia, logos or personalized distinctive markings thereupon.

While such processes as painting and co-molding may provide a solution for providing multi-colored solid articles, heretofore cloth or fabric articles have been colored by dyeing and printing. This provides a two-dimensional effect on the surface but does not provide a depth aspect to the appearance of the surface.

One means of providing a multi-colored product involves providing two or more layers and removing the top layer(s) to expose an underlying layer. U.S. Pat. No. 6,633,019 to John D. Gray is directed at forming a design in the surface of a panel, the panel comprised of an outer layer and an inner layer. A laser beam is directed at the outer layer to burn, vaporize or otherwise remove the outer layer thereby exposing the inner layer.

Lasers are also well known for marking products by exposing a surface to laser energy which may change the color of the plastic or the pigments which color the plastic surface.

While lasers are useful in this regard, they possess numerous limitations in that only certain colors may be formed. Further, the ablation process that takes place when a plastic is exposed to laser energy may result in significant charring and deterioration of the polymer into smoke and gummy residue.

Particularly with layered fibrous materials, lasers may be difficult to focus to allow accurate removal of a top layer.

Laser engraving of fleece materials has been disclosed by Synrad Inc. to provide a three-dimensional pattern or logo on the surface of a fibrous material but does not involve a color change.

What is needed is a method for providing a multi-color and three-dimensional appearance in a non-woven fabric. What is needed is a means of displacing a fibrous layer from a layered non-woven composite to expose an underlying layer, preferably in a decorative pattern, preferably where the layers are of different colors. It is thus an object of the present invention to provide a multi-layered non-woven fabric composite comprising two or more layers having different colors wherein portions of the top layer(s) may be displaced to expose the underlying layer in a decorative, three-dimensional pattern.

It is a further object of the present invention to displace the top layer(s) of a multi-layered non-woven fabric composite to expose an underlying layer using a pinsonic embossing process.

It is a still further object of the present invention to achieve a color change in a single layer of non-woven material by melting at least a portion of the non-woven material by pinsonic embossment, which causes a color differentiation by increasing the density of the non-woven material due to melting, compared to the surrounding unmelted material.

It is a still further object of the present invention to achieve a color change in a single layer of non-woven material by pinsonic embossment, wherein the temperature of embossment causes heat activation of pigments in the material, the pigments changing color due to the heat activation.

It is a still further object of the present invention to cause a color change in a non-woven material by ultrasonically embossing the surface of the material at a temperature where the top layer(s) of fibers melt and are drawn into the body of the material by capillary action resulting in one or both of a voided area and a change in color of the fibers.

SUMMARY OF THE INVENTION

According to the invention, a method is provided for forming a design in a non-woven layer by pinsonic embossing a three-dimensional pattern into the surface of the non-woven product. In one embodiment, the embossing causes a three-dimensional pattern and color change to be formed by melting and densifying the fibers below the outer surface of the non-woven layer.

In a second embodiment the embossing causes a three-dimension pattern and color change to be formed by melting the fibers and by activating heat activatable pigments used to color the non-woven layer.

In a third embodiment a multi-layered non-woven composite is provided and the top layer of the composite is displaced by pinsonic embossing exposing an underlying layer of a different color.

DETAILED DESCRIPTION AND THE PREFERRED EMBODIMENTS OF THE INVENTION

Figure 1:
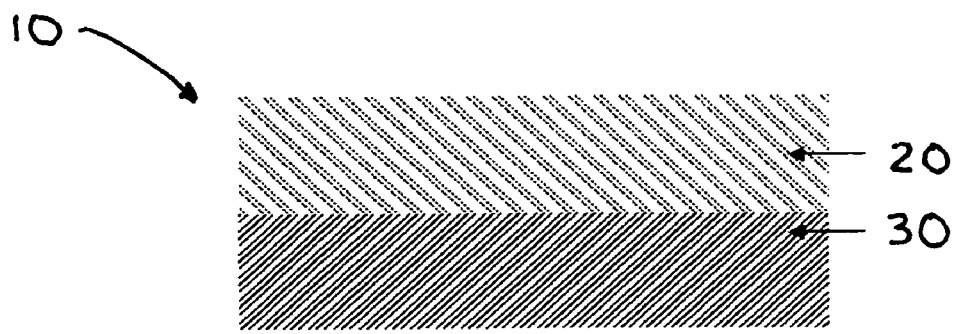
FIG. 1 is a cross-sectional view of a multi-layer non-woven composite before pinsonic embossing.

For elements common to the various embodiments of the invention, the numerical reference character between the embodiments is held constant, but distinguished by the addition of an alphanumeric character to the existing numerical reference character. In other words, for example, an element referenced at 10 in the first embodiment is correspondingly referenced at 10A, 10B and so forth in subsequent embodiments. Thus, where an embodiment description uses a reference character to refer to an element, the reference character applies equally, as distinguished by alphanumeric character, to the other embodiments where the element is common.

The use of ultrasonic energy to bond plastic materials together is well known. Similar or even dissimilar plastics may be joined through the use of heat generated from high frequency mechanical motion. The two plastic articles are placed one upon the other in a holding fixture and a titanium or aluminum component called a horn is brought into contact with the upper article. A controlled pressure is applied to the horn to assure contact of the two articles together and the horn is vibrated, usually at a frequency of 20 kHz or 40 kHz for a predetermined amount of time to heat and melt the two articles at their interface due to the vibrations. To produce the vibrations, an ultrasonic generator produces high frequency from line voltage which is converted to mechanical energy through a piezo-electronic acoustic transformer. The mechanical energy, vibrations of the piezo crystals, is transferred to the weld horn which transfers the energy into the plastic article. Heat friction is developed in the plastic article which melts the plastic in the local area contacted by the horn. Upon cooling, a mechanical bond has been formed by the solidified plastic. Use of semi-crystalline plastics which have a well-defined melting point allow fairly precise and crisp joints. Non-woven materials in sheet or roll form may be bonded or quilted through the use of contour rollers having specific patterns of pins projecting from their surface which may serve as anvils or horns for embossing a pattern on the surface of the non-woven material.

It has been found that the use of ultrasonic or pinsonic processing may be used not only to join and to emboss non-woven materials but to displace and change the appearance of portions of the non-woven material in a predetermined pattern to provide a decorative pattern. This pattern may include a change in the topography of the non-woven material, such that a three-dimensional pattern is obtained, but may also include the ability to provide multiple colors.

FIG. 1 is a schematic cross-sectional of a non-woven composite 10 including a first non-woven layer 20 overlying a second non-woven layer 30. The term "non-woven", as used herein means a fabric made directly from a web of fibers, wherein textile fibers are deposited in a random web or mat and held together by mechanical interlocking, such as needle-punching or hydro-entanglement, by fusing of the fibers, as in the case of thermoplastic fibers, or by bonding, such as with an adhesive. Non-woven materials may comprise natural fibers, synthetic fibers, bi-component fibers, shoddy and combinations thereof. The first non-woven layer 20 may be attached to the second non-woven layer 30 by any of the above methods or by other means as known in the art.

In a preferred embodiment of the present invention, the first non-woven layer 20 of composite 10 has a different color from the second non-woven layer 30. This may occur through pigmenting, dyeing or coating of the fibers.

Figure 2:
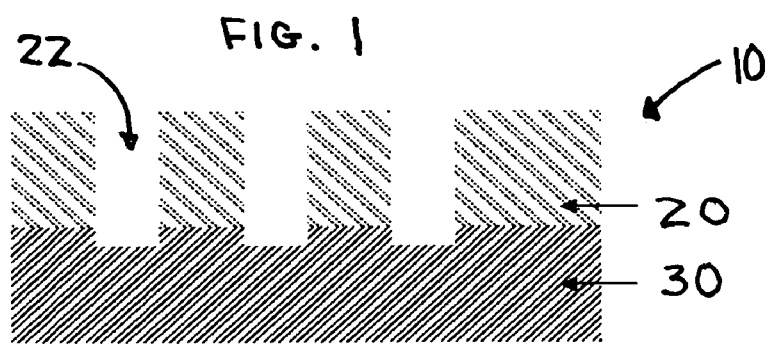
FIG. 2 is a cross-sectional view of the composite of FIG. 1 after pinsonic embossing.

FIG. 2 is a schematic cross-sectional view of the composite 10 of FIG. 1 after the composite has been ultrasonically embossed to displace portions of the non-woven first layer 20 in a pattern which allows the underlying layer 30 to be seen through opening 22 in the first layer 20. By applying ultrasonic energy in a pattern, defined by a series of pins or projections, the top layer 20 melts and flows into the underlying layer. Without being bound by any particular theory, it appears that the mass of the first non-woven layer 20 may be quite low (for instance, about 0.5 about 6 ounces per square yard) and the first layer 20 is drawn into the second layer 30 by capillary action and is absorbed completely or partially into the second layer and supported by the underlying porous nonwoven layer.

Thus, the second layer 30 may be viewed through opening 22 formed in the first layer due to the pinsonic embossing which has formed the openings in the first layer by melting and densification or contraction of the first layer.

Figure 5:
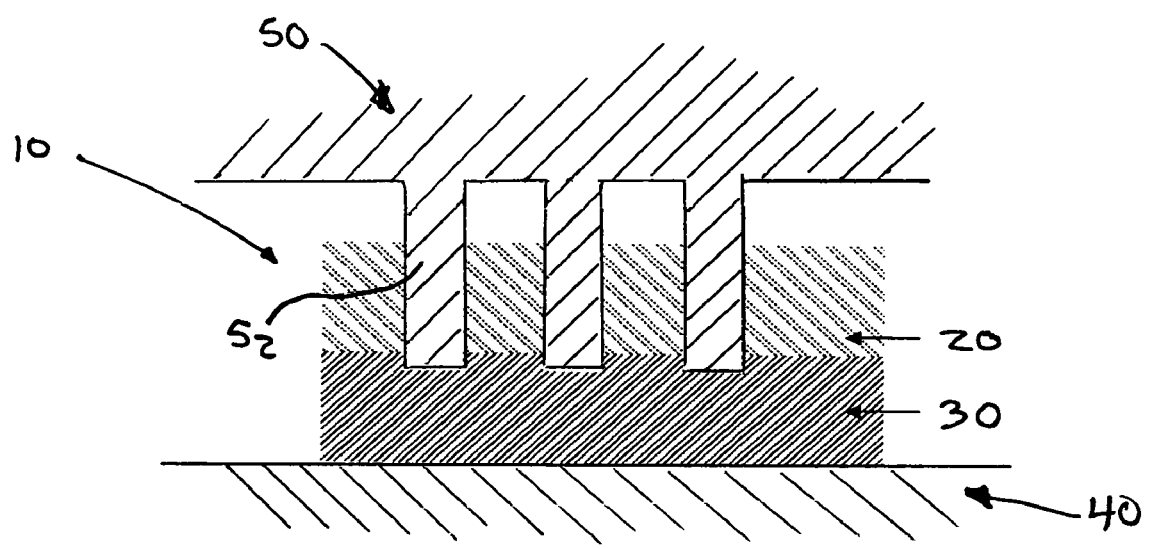
FIG. 5 is a cross-sectional view of the non-woven composite of FIG. 1 being acted upon by pinsonic embossing equipment.

FIG. 5 illustrates the non-woven composite 10 of FIG. 1 being acted upon by pinsonic embossing equipment. The non-woven composite 10 may be supported by an anvil or roller 40. A welding horn 50 comprising, preferably, a series of projections or pins 52 is pressed into the top non-woven layer 20 to melt the fibers and allow the polymer to wick via capillary action into the underlying layer 30 supported by the underlying porous nonwoven layer. Due to the low mass of the non-woven fibrous layer, the molten polymer is absorbed by the underlying layer and become essentially invisible. Alternatively, there may be a mixing of the melt from the first layer with the fibers of the second layer such that if each layer is dyed or pigmented differently, the mixing of the molten first layer with the fibers of the underlying layer forms a third color that is different and distinguishable from either of the original colors, forming the contrast in color of the present invention.

In addition, while non-woven materials are preferred as the underlying layer 30 of material, other porous materials may function in a similar manner, including but not limited to, woven materials, foams, sponge, paper, leather and other fibrous materials.

While this invention is described herein as using two layers of non-woven material, any number of layers may make up the composite where one or more overlying layers may be removed to expose one or more underlying layers.

In addition, the upper layer, which will be partially removed or displaced by the use of ultrasonics, may comprise a coating or dye applied to the top surface of a fibrous non-woven layer. For instance, an upper layer may comprise a coating of a first color applied to the fibers of an underlying layer (the fibers having a second color), such that upon engagement of the coating layer with an ultrasonic horn and application of sufficient energy, the coating layer is displaced, leaving a multicolor appearance, as the underlying layer may viewed through the area where the coating layer has been displaced. In a still further example, a fibrous layer having a first color may be dyed along either of its surfaces, the dye penetrating only slightly into the fibrous layer. Accordingly, the fibrous layer may be dyed along a surface with one color, dyed along a second surface with a second color, thereby overlying and underlying the first color. Upon removal or displacement of the dyed fibers at the surface, a multicolored composite may be formed. Further, both the top dyed layer and middle layer may be removed to expose a dyed bottom layer.

Figure 3:
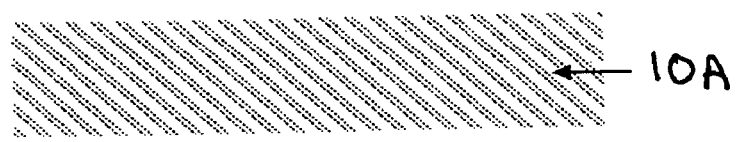
FIG. 3 is a cross-sectional view of a non-woven material prior to pinsonic embossing.
Figure 4:
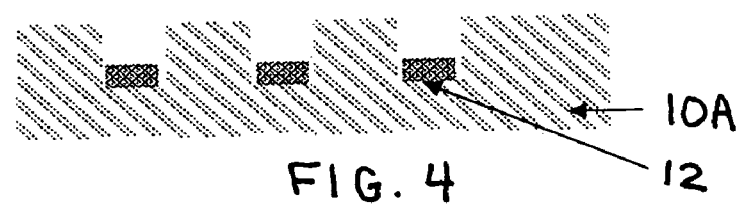
FIG. 4 is a cross-sectional view of the non-woven material of FIG. 3 after pinsonic embossing.

A second embodiment of the present invention is illustrated in FIGS. 3 and 4. Here, a somewhat higher density non-woven layer 10A is provided (for instance, between about 1 and about 11 ounces/square yard). An ultrasonic horn, having a predetermined, decorative pattern, preferably of pins or projections provided on the surface, engages with the upper portion of layer 10A. Upon activation of the ultrasonic energy into the layer, a portion of the layer is melted and densifies or contracts to form a pattern 12 of densified polymer having a different color than that of the original fibrous layer 10A that has not been acted upon by the horn. The densified pattern 12 may be of a different color due to the increased density, due to melting of the polymer and pigments or dyestuffs which color the layer 10A.

In a related embodiment, heat activatable (thermochromic) pigments or dyestuffs may be used to color layer 10A which when acted upon by the ultrasonic energy are heated to a temperature which causes the pigment to change color to provide a discerning pattern 12. The term "heat activatable", as used herein, means a pigment or dye used to color a fiber or web which upon exposure to a certain temperature, changes from a first color to a second color.

It is further possible, through careful selection of the energy levels and pigments/dyes used, to provide multiple colors within a non-woven layer by using pigments/dyes that may be activated at different temperatures, and providing heat levels locally to activate those pigments/dyes, in combination with melting of the polymer fibers locally to cause them to densify and yield a different color or shade.

It is still further possible to combine the technologies of using thermochromic pigments and dyes and densification of a fibrous layer in an underlying layer, and removal or displacement of a top layer of fibrous material in accordance with the present invention to form a composite having multiple colors and decorative patterns. In other words, referring to FIG. 1, nonwoven layer 10 would be acted upon by an ultrasonic horn to remove or displace a portion of that layer in a pattern, while nonwoven layer 20 of a different color and containing thermochromic pigments or dyes, would be acted upon by an ultrasonic horn to provide a different color from either the first layer or the second layer.

Thus, it can be seen that the present invention provides methods of producing a non-woven layer having a pattern formed therein by ultrasonic or pinsonic embossing which may further provide the feature of multiple colors by some combination of 1) locally densifying the non-woven layer, 2) by causing heat activatable pigments and dyes to change color, and 3) by melting a portion of a non-woven layer (or coating or dye applied to the surface of the layer) such that it is absorbed in an underlying layer, whereby the underlying layer is then exposed through openings formed in the top layer.

The description and drawings illustratively set forth the presently preferred invention embodiments. We intend the description and drawings to describe these embodiments and not to limit the scope of the invention. Obviously, it is possible to modify these embodiments while remaining within the scope of the following claims. Therefore, within the scope of the claims one may practice the invention otherwise than as the description and drawings specifically show and describe.

What is claimed is:

1. A method of providing a multi-colored, multi-layered non-woven article comprising the steps of:
   (a) providing a first non-woven fibrous web having a first color,
   (b) providing a second non-woven fibrous web having a second color,
   (c) attaching said first web to said second web in layered disposition, to form a non-woven composite, wherein said first web forms a first layer and said second web forms a second layer that at least partially underlies said first layer,
   (d) providing at least one ultrasonic horn comprising a predetermined pattern of one or more projections having a flat end,
   (e) pressing said horn into said composite first layer and vibrating said projections at a frequency to cause said fibers of said first web to melt or become molten, wherein said first layer molten fibers are dispersed into said second layer and forming openings in said first layer thereby exposing said color of said second layer, wherein said first color and said second color are not the same.

2. The method of claim 1, wherein said vibration frequency is between about 15 kHz to about 40 kHz.

3. The method of claim 1, wherein said projections comprise pins.

4. The method of claim 1, wherein the composite formed in step (c) may include more than two webs in layered disposition and wherein the melting of fibers by vibrating said projections may occur in any and all adjacent layers.

5. A method of providing a multi-colored, multi-layered non-woven article comprising the steps of:
   (a) providing a first non-woven fibrous web having a first color,
   (b) providing a porous substrate having a second color,
   (c) attaching said first web to said porous substrate in layered disposition, to form a composite wherein said non-woven web forms a first layer and said porous substrate forms a second layer that at least partially underlies said first layer,
   (d) providing at least one ultrasonic horn comprising a predetermined pattern of one or more projections having a flat end,
   (e) pressing said horn into said composite first layer and vibrating said projections at a frequency to cause said fibers of said first web to melt or become molten wherein said first web molten fibers are dispersed into said porous substrate leaving openings in said first layer which expose said second color of said second layer, wherein said first color and said second color are not the same.

6. The method of claim 5, wherein said vibration frequency is between about 15 kHz to about 40 kHz.

7. The method of claim 5, wherein said projections comprise pins.

8. A method of providing a multi-colored non-woven article comprising the steps of:
   (a) providing a non-woven fibrous web having a first color and a thickness,
   (b) providing at least one ultrasonic horn comprising a predetermined pattern of one or more cylindrical projections,
   (c) pressing said horn into said web and vibrating said projections to cause said fibers of said web to melt or become molten wherein said molten fibers densify leaving openings partially penetrating said thickness, said densified fibers visible in said openings, wherein said densified fibers have a color different from said first color.

9. The method of claim 8, wherein the non-woven fibrous web includes two or more webs in layered disposition and wherein the melting of fibers by vibrating said projections may occur in any and all adjacent layers.

10. The method of claim 8, wherein said densified and contracted fibers located near the bottom of said openings are of a second color different than said first color due to said densification.

11. The method of claim 8, wherein said first color of said non-woven fibrous web is provided at least partially by at least one thermochromic pigment.

12. The method of claim 8, wherein said first color of said non-woven fibrous web is provided at least partially by at least one thermochromic dye.

13. The method of claim 11, wherein the change in color of said molten fibers is due to heat activation of said thermochromic pigment.

14. The method of claim 12, wherein the change in color of said molten fibers is due to heat activation of said thermochromic dye.

15. A method of providing a multi-colored, multi-layered non-woven article comprising the steps of:
   (a) providing a first non-woven fibrous web having a first color and first and second surfaces,
   (b) applying a coating of a second color to the first and/or second surface of said web, to form a non-woven composite, wherein said coating forms a layer on said web,
   (c) providing at least one ultrasonic horn comprising a predetermined pattern of one or more projections having a flat end,
   (d) pressing said horn into said composite first layer and vibrating said projections at a frequency to cause said coating to be displaced or removed, and forming openings in said coating, thereby exposing said first non-woven web, wherein said first color and said second color are not the same.

16. The method of claim 15, wherein said vibration frequency is between about 15 kHz to about 40 kHz.

17. The method of claim 15, wherein said projections comprise pins.

18. The method of claim 15, wherein the composite formed in step (b) may include more than one web in layered disposition and wherein the removal or displacement of an overlying layer by vibrating said projections may occur in any and all overlying layers.

19. A method of providing a multi-colored, multi-layered non-woven article comprising the steps of:
 (a) providing a first non-woven fibrous web of a thickness having a first color and a top and bottom surface,
 (b) dyeing the top surface of said web to form a dyed surface, wherein said dye provides a second color and said second color overlies said first color, wherein said dye does not fully penetrate the thickness of said web,
 (c) providing at least one ultrasonic horn comprising a predetermined pattern of one or more projections having a flat end,
 (d) pressing said horn into said dyed surface and vibrating said projections at a frequency to cause said dyed surface to be displaced or removed and forming openings in said dyed surface, thereby exposing said first color, wherein said first color and said second color are not the same.

20. The method of claim 19, wherein said vibration frequency is between about 15 kHz to about 40 kHz.

21. The method of claim 19, wherein said projections comprise pins.

22. The method of claim 19, wherein the composite formed in step (b) may include more than one web in layered disposition and wherein the removal or displacement of an overlying layer by vibrating said projections may occur in any and all overlying layers.

23. The method of claim 19, wherein said web bottom surface is dyed a third color, and pressing said horn into said web removes or displaces said top surface and said nonwoven fibrous web to expose said dyed bottom surface.

* * * * *